(12) United States Patent
Murphy et al.

(10) Patent No.: US 8,127,526 B2
(45) Date of Patent: Mar. 6, 2012

(54) RECOATABLE EXHAUST LINER COOLING ARRANGEMENT

(75) Inventors: Michael Joseph Murphy, Vernon, CT (US); Jeffrey R. Lavin, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1020 days.

(21) Appl. No.: 12/015,033

(22) Filed: Jan. 16, 2008

(65) Prior Publication Data

US 2009/0178383 A1  Jul. 16, 2009

(51) Int. Cl.
*F02C 7/08* (2006.01)
*F02G 1/00* (2006.01)
*F02G 3/00* (2006.01)

(52) U.S. Cl. ............... 60/39.5; 60/766; 60/754; 60/755; 60/757; 60/760; 60/758; 60/752

(58) Field of Classification Search .................... 60/752, 60/766, 754, 755, 757, 758, 760, 39.5
See application file for complete search history.

(56) References Cited

U.S. PATENT DOCUMENTS

| 3,979,065 | A |   | 9/1976  | Madden |
| 4,171,093 | A |   | 10/1979 | Honeycutt, Jr. et al. |
| 4,614,082 | A | * | 9/1986  | Sterman et al. ................ 60/796 |
| 5,077,969 | A |   | 1/1992  | Liang et al. |
| 5,531,457 | A |   | 7/1996  | Tibbott et al. |
| 5,535,585 | A |   | 7/1996  | Eichhorn |
| 6,000,908 | A |   | 12/1999 | Bunker |
| 6,079,199 | A |   | 6/2000  | McCaldon et al. |
| 6,918,743 | B2 |  | 7/2005  | Gekht et al. |
| 7,219,498 | B2 |  | 5/2007  | Hadder |
| 2006/0112676 | A1 | * | 6/2006 | Cowan et al. ................... 60/266 |
| 2006/0179816 | A1 |   | 8/2006 | Murphy et al. |

* cited by examiner

*Primary Examiner* — William Rodriguez
*Assistant Examiner* — Craig Kim
(74) *Attorney, Agent, or Firm* — Carlson, Gaskey & Olds

(57) ABSTRACT

A gas turbine engine includes an exhaust liner having cold and hot sheets radially spaced from one another and interconnected by a band arranged in a cavity between the hot and cold sheets. In one example, the band is Z-shaped to permit thermal growth of the hot sheets relative to the cold sheets in the axial and radial directions. The hot sheets include axially adjacent portions that provide slots that are in fluid communication with the space. Cooling fluid is provided to the cavity through impingement jets in the cold sheet. The slots are arranged radially between the hot sheet portions.

10 Claims, 2 Drawing Sheets

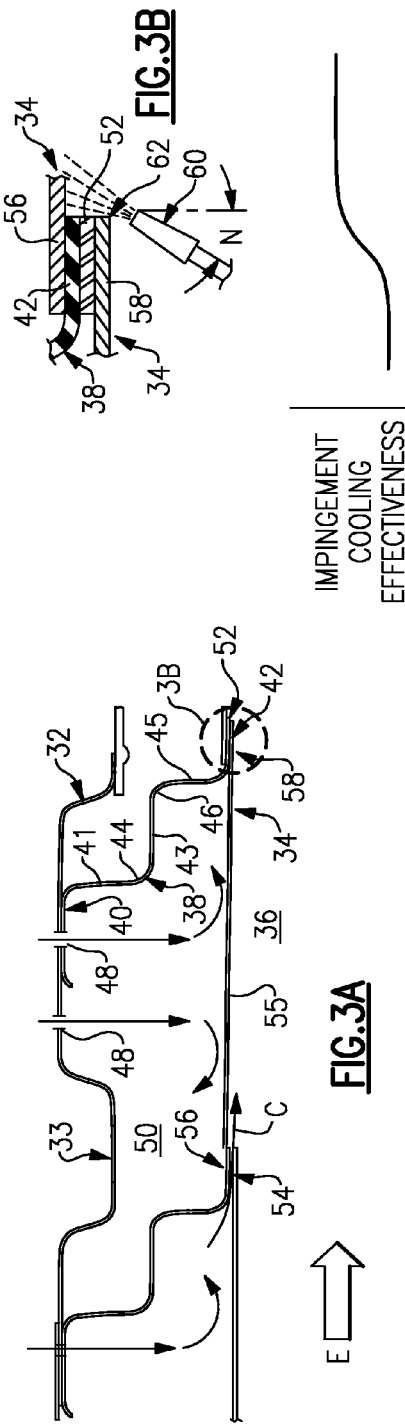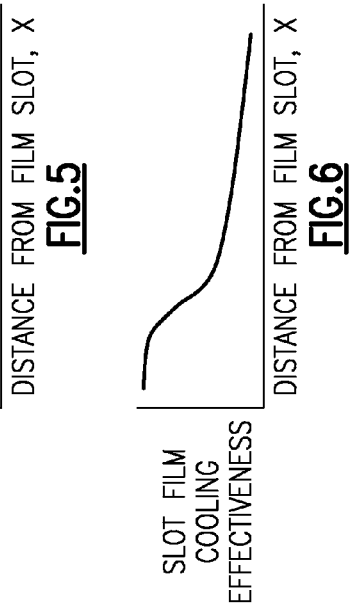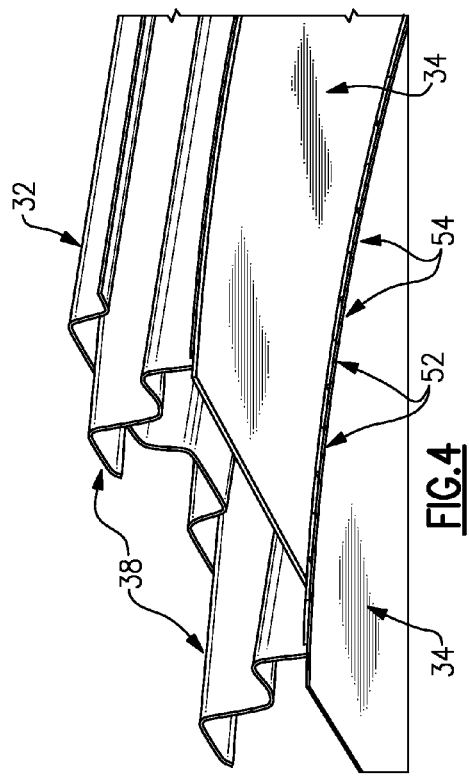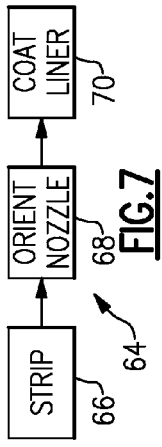

RECOATABLE EXHAUST LINER COOLING ARRANGEMENT

STATEMENT REGARDING FEDERALLY SPONSORED RESEARCH OR DEVELOPMENT

This invention was made with government support with the United States Navy under Contract No.: N00019-02-C-3003. The government therefore has certain rights in this invention.

BACKGROUND

This disclosure relates generally to gas turbine engine exhaust liners. More particularly, the disclosure relates to providing cooling slots in exhaust liners that can be recoated without masking, for example.

Turbojet engines typically include a removable exhaust liner that is secured and supported relative to an exhaust duct. The exhaust liner typically includes hot sheets that are exposed to core exhaust passage. It is desirable to cool surfaces of the hot sheets that face the core exhaust passage to reduce the temperature of the hot sheets. In one example arrangement, the hot sheets include numerous small-diameter holes (up to a quarter million or more) that supply a cooling flow from a bypass flow path to the surfaces.

The hot sheets are typically coated with a thermal barrier material to provide thermal protection to the exhaust liner. This thermal barrier material wears over time. Typically the hot sheets are simply replaced. It is not economical to recoat the hot sheets due to the large number of cooling holes, since all of the holes would need to be plugged or redrilled to ensure that the holes are not obstructed with the thermal barrier material.

In exhaust liner arrangements that use a cold sheet interconnected to the hot sheet, impingement apertures are used to communicate the bypass flow to the cooling holes. The cooling holes, impingement apertures and surrounding structure must be configured such that undesired thermal growth is minimized and the cooling flow is effectively communicated from the bypass flow path to the hot sheet surfaces.

What is needed is an exhaust liner that is recoatable with thermal barrier material and that effectively cools the hot sheets.

SUMMARY

A gas turbine engine is disclosed that includes an exhaust liner having cold and hot sheets radially spaced from one another and interconnected by a band arranged in a cavity between the hot and cold sheets. In one example, the band is Z-shaped to permit thermal growth of the hot sheets relative to the cold sheets in the axial and radial directions. The hot sheets include axially adjacent portions that provide slots that are in fluid communication with the space. Cooling fluid is provided to the cavity through impingement jets in the cold sheet. The slots are arranged radially between the portions. The impingement jets are positioned to provide effective fluid flow to the slots.

These and other features of the disclosure can be best understood from the following specification and drawings, the following of which is a brief description.

BRIEF DESCRIPTION OF THE DRAWINGS

FIG. 3*a* is an enlarged cross-sectional view of the inner cooling liner structure shown at 3*a* in FIG. 2.

FIG. 3*b* is a enlarged cross-sectional view of hot sheets shown at 3*b* in FIG. 3*a*.

FIG. 4 is a perspective view of the inner cooling liner shown in FIG. 3*a*.

FIG. 5 is a graph illustrating the effectiveness of impingement apertures in a cold sheet relative to their axial distance from cooling slots.

FIG. 6 is a graph illustrating the effectiveness of the cooling slots relative to their radial distance from the impingement apertures.

FIG. 7 is a highly schematic flow chart depicting a method of recoating the exhaust liner.

DETAILED DESCRIPTION

Figure 1:
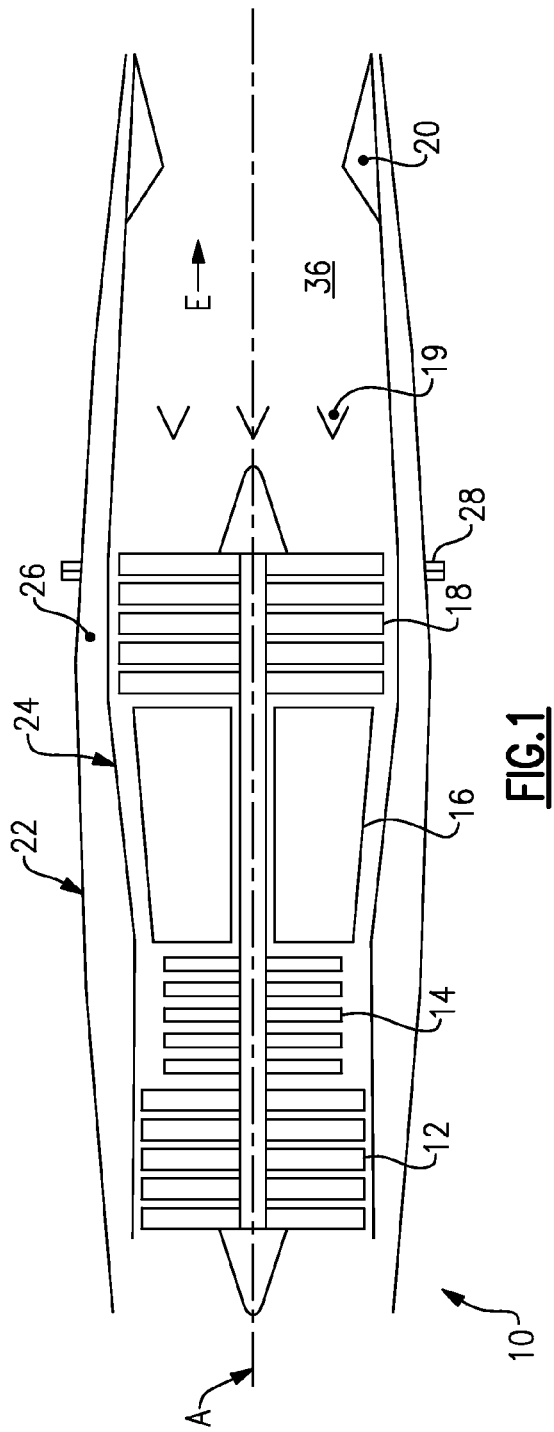
FIG. 1 is a highly schematic view of an example turbojet engine.

FIG. 1 illustrates an example turbojet engine 10. The engine 10 generally includes a fan section 12, a compressor section 14, a combustor section 16, a turbine section 18, an augmentor section 19 and a nozzle section 20. The compressor section 14, combustor section 16 and turbine section 18 are generally referred to as the core engine. An axis A of the engine 10 is generally disposed and extends longitudinally through the sections. An outer engine duct structure 22 and an inner cooling liner structure 24 provide an annular secondary fan bypass flow path 26 around a primary exhaust flow path E. The bypass flow path 26 receives bypass flow from the fan section 12.

Figure 2:
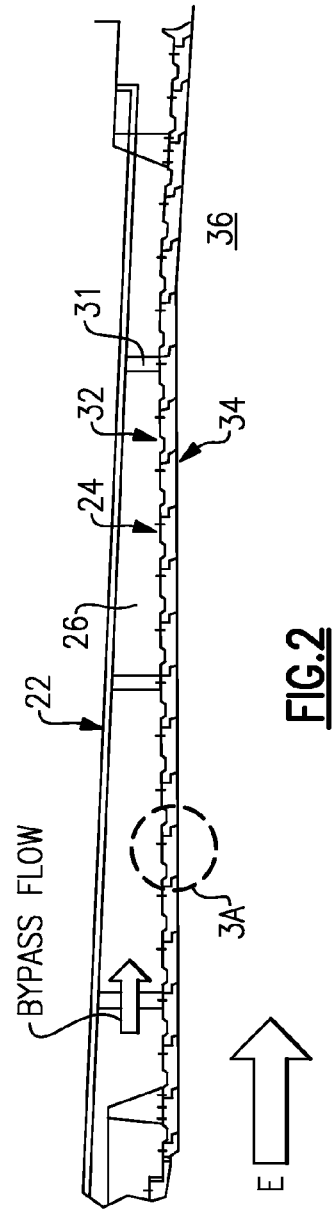
FIG. 2 is a cross-sectional view through a bypass flow path and inner cooling liner structure.

In one example, the duct structure 22 acts as a liner support member. An example arrangement for supporting the exhaust liner 24 relative to the duct structure 22 is schematically illustrated by hangers 31 in FIG. 2. With continuing reference to FIG. 2, the example exhaust liner 24 includes hot sheets 34 that are exposed to a core exhaust passage 36. The cold and hot sheets 32, 34 can be constructed from multiple sheet portions secured to one another.

Referring to FIG. 3*a*, the cold and hot sheets 32, 34 are interconnected in a radial direction by annular bands 38 that have a generally Z-shaped cross-section. In the example shown, the band 38 includes a first end portion 40 secured to the cold sheet 32 and a second end portion 42 secured to the hot sheet 34. The example band 38 includes first and second bends 44, 46 provided between walls 41, 43, 45 that are transverse to their adjoining walls. The bands 38, which are arranged in a cavity 50 between the cold and hot sheets 32, 34, permit the hot sheets 34 to thermally grow axially and radially relative to the cold sheet 32.

Impingement jets 48 are provided in the cold sheet 32 to communicate bypass fluid from the bypass flow path 26 into the cavity 50.

Cooling fluid C from the cavity 50 is provided through cooling slots 54 at the hot sheets 34 to cool a surface 55 of the hot sheets 34 that faces the core exhaust passage 36. The cooling slots 54 are provided at the joint between the hot sheets 34 and the band 38. In the example shown, each hot sheet 34 includes first and second end portions 56, 58. The first portion 56 of one hot sheet 34 is arranged radially outwardly and in overlapping relationship to the second portion 58 of an adjacent hot sheet 34, best shown in FIG. 3*b*. The second end portion 42 of the band 38 is secured radially between the first and second end portions 56, 58 of the hot sheets 34, for example. Spacers 52 are arranged radially between the first and second end portions 56, 58 to provide the slots 54, which are arranged circumferentially between the spacers 52, best shown in FIG. 4. In the example, discrete, separate structures are secured to the second end portion 42 of the band 38 and one of the hot sheets 34 to provide the spacers 52. However, it should be understood that the hot sheets 34 and/or the band 38 could provide the spacers 52.

FIGS. 5 and 6 graphically illustrate the cooling effectiveness of the impingement jets 48 and cooling slots 54. The cooling slots 54 are narrow, elongated apertures in the example. FIG. 3A illustrates how the impingement jets 48 are spaced relative to the cooling slots 54 in order to provide adequate cooling to the hot sheet 34. Generally, FIG. 5 illustrates that the impingement jets 48 are spaced to increase the backside cooling of the hot sheet 34 as the cooling effectiveness of the cooling slots 54 decreases with axial distance from the cooling slot 54 as shown in FIG. 6.

A method of coating the hot sheets 34 is shown generally at 64 in FIG. 7. The worn thermal barrier material (TBM), if applicable, is stripped from the hot sheets 34, as indicated at block 66. A nozzle 60 is oriented relative to the hot sheets 34, as indicated at block 68 and shown in FIG. 3b. The nozzle 60 is positioned at an angle N so that a portion 62 of the hot sheet 34 shields the cooling slots 54 to prevent new TBM from obstructing the cooling slots 54. For example, the nozzle 60 is canted rearward in a direction away from the cooling slots 54 so that TBM is not sprayed into the cooling slots 54. In this manner, the cooling slots 54 do not have to be masked or plugged with a removable structure. The hot sheets 34 can then be coated with new TBM using the nozzle 60, as indicated at block 70. The cooling slots 54 do not need to be drilled.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine engine comprising:
    an exhaust liner including axially adjoining hot sheets radially spaced from one another at a joint that provides cooling slots arranged radially between the adjoining hot sheets;
    a cold sheet spaced radially outwardly from the hot sheets and connected to at least one of the hot sheets by a band arranged in a cavity secured between the hot and cold sheets, wherein the hot sheets include axially adjacent portions that provide slots that are in fluid communication with the space, the slots are arranged radially between the portions;
    wherein the hot sheets provide first and second hot sheets each having first and second end portions, first end portion of the first hot sheet arranged radially outwardly of the second end portion of the second hot sheet; and
    wherein a portion of the band is secured at the joint in a location in which the first and second end portions respectively of the first and second hot sheets axially overlap, and the band is discrete from either the hot sheets or the cold sheet.

2. The gas turbine engine according to claim 1, wherein the hot sheets are connected to the band at the joint.

3. The gas turbine engine according to claim 2, comprising an outer duct spaced radially outwardly from the cold sheet and forming a bypass flow passage there between, the cold sheets including cooling apertures fluidly interconnecting the bypass flow passage with the cavity for supplying cooling fluid to the slots.

4. The gas turbine engine according to claim 3, comprising a core exhaust passage arranged centrally within the hot sheets and axially downstream from turbines, the slots for providing the cooling fluid to surfaces of the hot sheets facing the core exhaust passage.

5. The gas turbine engine according to claim 1, wherein the slots are arranged radially between the first and second end portions.

6. The gas turbine engine according to claim 5, wherein spacers are arranged radially between the first and second end portions, the slots provided circumferentially between the spacers.

7. The gas turbine engine according to claim 6, wherein the portion of the band is arranged radially between the first and second end portions, the first and second end portions, spacers and portion of the band secured to one another in a radially overlapping relationship.

8. The gas turbine engine according to claim 3, wherein the band includes a bend extending radially inwardly from the cold sheet and axially away from a turbine section, the bend configured to direct the cooling flow from the cooling apertures to the slots.

9. The gas turbine engine according to claim 6, wherein the spacers are discrete from at least one of the first and second end portions.

10. The gas turbine engine according to claim 6, wherein the spacers are discrete from the band.

* * * * *